United States Patent
Welle et al.

(10) Patent No.: US 12,019,137 B2
(45) Date of Patent: Jun. 25, 2024

(54) RADAR SENSOR, INTERCHANGEABLE RADAR SENSOR ARRANGEMENT, FIELD DEVICE AND CONTAINER

(71) Applicant: VEGA GRIESHABER KG, Wolfach (DE)

(72) Inventors: Roland Welle, Hausach (DE); Joerg Boersig, Oberwolfach (DE); Levin Dieterle, Oberwolfach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 544 days.

(21) Appl. No.: 16/938,588

(22) Filed: Jul. 24, 2020

(65) Prior Publication Data
US 2021/0026001 A1 Jan. 28, 2021

(30) Foreign Application Priority Data
Jul. 25, 2019 (EP) .................................... 19188373

(51) Int. Cl.
*G01S 13/02* (2006.01)
*G01S 13/87* (2006.01)
*G01S 7/02* (2006.01)

(52) U.S. Cl.
CPC ............ *G01S 13/02* (2013.01); *G01S 13/878* (2013.01); *G01S 7/027* (2021.05)

(58) Field of Classification Search
CPC .......... G01S 7/027; G01S 7/412; G01S 7/415; G01S 13/48; G01S 7/40; G01S 7/414; G01S 13/86; G01S 13/04; G01S 13/06; G01S 13/87; G01S 13/88; G01S 7/02; G01S 13/582; G01S 13/584; G01S 13/885; G01S 13/08; G01S 13/341; G01S 13/422; G01S 13/865; G01S 13/886; G01S 13/931; G01S 13/867; G01S 7/03; G01F 23/284; G01F 25/0061; G01F 23/28; G01F 23/296; G01F 23/282; G01F 23/00; B25J 9/1676; B60C 11/24; H04Q 9/00; B60R 25/2009; G05D 1/0088; G01R 27/2611; G01D 11/24; G05B 17/02
USPC ......................................................... 342/27
See application file for complete search history.

(56) References Cited

U.S. PATENT DOCUMENTS

| 6,476,760 | B1 * | 11/2002 | Winter ..................... G01S 13/48 342/149 |
| 9,677,922 | B2 | 6/2017 | Skowaisa |
| 10,594,017 | B2 | 3/2020 | Waelde et al. |
| 10,788,351 | B2 | 9/2020 | Welle et al. |
| 2007/0086624 | A1 * | 4/2007 | Breed ............... B60R 21/01552 382/104 |

(Continued)

FOREIGN PATENT DOCUMENTS

| DE | 10 2015 219 612 A1 | 4/2017 |
| DE | 102016204274 A1 * | 9/2017 |

(Continued)

*Primary Examiner* — Peter M Bythrow
*Assistant Examiner* — Nazra Nur Waheed
(74) *Attorney, Agent, or Firm* — Oblon, McClelland, Maier & Neustadt, L.L.P.

(57) ABSTRACT

A radar sensor device including a first radar sensor arrangement configured to measure a fill level of a medium in a container and a second radar sensor arrangement configured to monitor an environment of the radar sensor outside the container.

22 Claims, 4 Drawing Sheets

(56) References Cited

U.S. PATENT DOCUMENTS

| | | | |
|---|---|---|---|
| 2015/0016269 A1 | 1/2015 | Ramchandran | |
| 2015/0253175 A1* | 9/2015 | Jirskog | G01S 13/08 |
| | | | 342/124 |
| 2016/0121989 A1* | 5/2016 | Okuda | B63H 25/06 |
| | | | 701/2 |
| 2016/0358054 A1* | 12/2016 | Armitage | G06K 7/1417 |
| 2017/0097413 A1* | 4/2017 | Gillian | A63F 13/24 |
| 2017/0284854 A1* | 10/2017 | Skowaisa | G01F 25/20 |
| 2018/0283926 A1* | 10/2018 | Kech | G01S 13/89 |
| 2018/0373340 A1* | 12/2018 | Cheng | G06F 3/038 |
| 2019/0137601 A1* | 5/2019 | Driscoll | G01S 13/931 |
| 2019/0146447 A1* | 5/2019 | Albert | G05B 23/024 |
| | | | 700/108 |
| 2019/0187250 A1* | 6/2019 | Ru | G01S 7/4052 |
| 2019/0272042 A1* | 9/2019 | Shivam | B67D 1/0888 |

FOREIGN PATENT DOCUMENTS

| | | | | |
|---|---|---|---|---|
| DE | 10 2017 217 805 A1 | | 4/2019 | |
| DE | 102017217805 A1 * | | 4/2019 | G01F 23/284 |
| EP | 2803953 A1 * | | 11/2014 | B65F 1/16 |
| EP | 2 824 433 A1 | | 1/2015 | |
| EP | 2 824 461 A1 | | 1/2015 | |
| EP | 2824431 A1 * | | 1/2015 | G01F 1/002 |
| EP | 3 171 138 A1 | | 5/2017 | |
| EP | 3 312 859 A1 | | 4/2018 | |
| EP | 3 467 447 A1 | | 4/2019 | |
| KR | 2019054664 A * | | 5/2019 | G01S 13/872 |
| WO | WO 2001023906 A1 * | | 9/2000 | |
| WO | WO-2001023906 A1 * | | 4/2001 | G01S 13/82 |
| WO | WO 2016/176600 A1 | | 11/2016 | |

\* cited by examiner

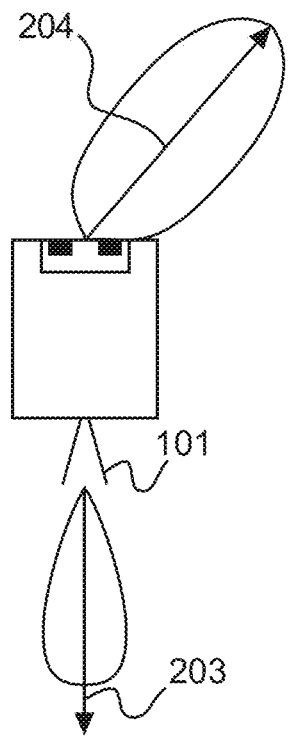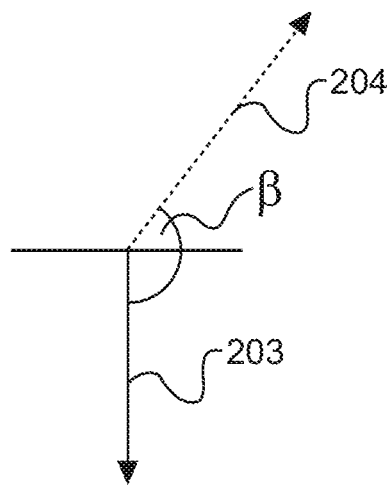
Fig. 2C    Fig. 2D
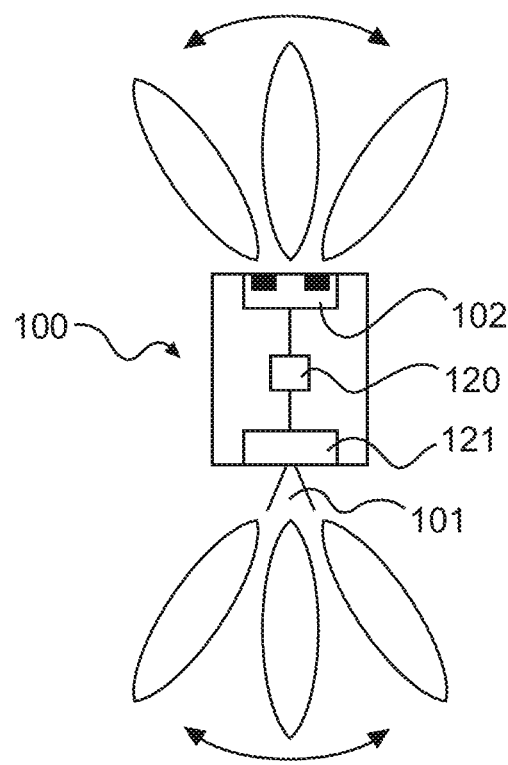
Fig. 3

RADAR SENSOR, INTERCHANGEABLE RADAR SENSOR ARRANGEMENT, FIELD DEVICE AND CONTAINER

CROSS-REFERENCE TO RELATED APPLICATIONS

This application claims the benefit of the filing date of European Patent Application No. 19 188 373.5 filed on 25 Jul. 2019 the entire contents of which is incorporated herein by reference.

FIELD OF THE INVENTION

The disclosure relates to measuring instruments, configured for the use in industrial environment. In particular, the disclosure relates to a radar sensor, an exchangeable radar sensor arrangement, a field device comprising a radar sensor arrangement and a container with a field device mounted thereon.

BACKGROUND

In the process industry, automation technology and production technology, field devices are used to measure process variables such as fill level, limit level, flow, temperature or speed. The operation and parameterization of such field devices is carried out via a digital, possibly wireless, interface or via a user input directly on the field device. Examples of such interfaces are HART, IO-Link, Bluetooth or NEC. The user inputs directly at the field device by the user interacting with the field device via keys, magnetic elements or similar. For this purpose, special operating modules can be used which are removable from the field device and are supplied with power via the field device. The user can input, for example, via four keys. In addition, a display can be provided which shows the entire input to the user and thus provides a feedback via the user's input.

SUMMARY

There may be a desire to simplify the operation of field devices.

A first aspect of the present disclosure relates to a radar sensor device, which comprises a first radar sensor arrangement and a second radar sensor arrangement. The first radar sensor arrangement is configured to measure a fill level of a medium in a first direction, and for example in a container. It may also be provided that the first radar sensor arrangement is configured to measure a limit level, a fill level of an open water body and/or the flow velocity of a medium. The latter is carried out, for example, by means of a Doppler measurement with a radar signal that appears at an angle to the medium and is reflected, for example, by crimps on the surface.

The second radar sensor arrangement is configured to monitor an environment of the radar sensor in a second direction, for example outside the container. For example, it monitors a different area than the first radar sensor arrangement.

The term "environment" of the radar sensor in the context of the present disclosure comprises or consists of areas, in which the filling material surface to be measured by the fill level measuring instrument is not located.

The radar sensor device may be configured to use the measurement data of the second radar sensor arrangement to influence the measurement from the first radar sensor arrangement. Application examples are stacked IBC containers or an increase in the measurement rate of the first radar sensor arrangement when a person approaches the second radar sensor arrangement. According to an embodiment, the radar sensor is configured for process automation in industrial environment. The term "process automation in the industrial environment" can be understood as a sub-area of technology which includes all interventions to operate machines and systems without human participation. One goal of process automation is to automate the interaction of individual components of a plant in the chemical, food, pharmaceutical, petroleum, paper, cement, shipping or mining industries. For this purpose, a plurality of sensors can be used, which are in particular adapted to the specific requirements of the process industry, such as mechanical stability, insensitivity to contamination, extreme temperatures and extreme pressures. Measurement values of these sensors are usually transmitted to a control centre, in which process parameters such as fill level, limit level, flow, pressure or density can be monitored and settings for the entire plant can be changed manually or automatically.

A sub-area of process automation in the industrial environment relates to the logistics automation. In the field of logistics automation, processes within a building or within an individual logistics system are automated by means of distance sensors and angle sensors. Typical applications are e.g. systems for logistics automation in the area of baggage handling and cargo handling at airports, in the area of traffic monitoring (toll systems), in retail, parcel distribution or also in the area of building security (access control). Common to the examples listed above is that a presence detection in combination with an exact measurement of the size and position of an object is required by the respective application side. For this purpose, sensors based on optical measuring methods using lasers, LEDs, 2D cameras or 3D cameras that measure distances according to the transit time principle (time of flight, ToF) can be used.

A further sub-area of process automation in the industrial environment relates to the factory/production automation. Applications for this can be found in the most diverse industries such as automobile manufacturing, food production, pharmaceutical industry or generally in the field of packaging. The aim of factory automation is to automate the production of goods by means of machines, production lines and/or robots, i.e. to run it without human intervention. The sensors used in this process and specific requirements with regard to the accuracy of measurement when detecting the position and size of an object are comparable to those used in the previous example of logistics automation.

According to an embodiment, the first radar sensor arrangement is configured to transmit a first radar measuring signal to measure the fill level in a first direction. The second radar sensor arrangement is configured to transmit a second radar measuring signal in a second direction, which is different from the first direction, for monitoring the environment of the radar sensor.

For example, the first direction and the second direction comprise an angle greater than 90°. According to an embodiment, this angle is 180°, so that the two radar measuring signals are transmitted in opposite directions.

According to an embodiment, the radar sensor device comprises a measuring device housing, wherein the first radar sensor arrangement and/or the second radar sensor arrangement are arranged in the measuring device housing.

In particular, it may be provided that the second radar sensor arrangement transmits its measuring signal through the housing wall in the direction of the radar sensor environment to be monitored.

According to a further embodiment, the second radar sensor arrangement is configured to recognise a gesture of a user, wherein the radar sensor, and in particular a processor or another control unit of the radar sensor is configured to use this gesture to control the first radar sensor arrangement.

According to a further embodiment, the second radar sensor arrangement is configured to detect an interfering reflector outside the container, wherein the radar sensor or its control unit is configured to use the knowledge of the interfering reflector to identify an interfering reflection detected by the first radar sensor arrangement. Hence, in particular position data of the interfering reflector, which was detected by the second radar sensor arrangement, may be used to detect an interfering reflector reflection in the echo curve detected by the first radar sensor arrangement and thus facilitate the identification of the useful echo.

This interfering reflector external to the container may, for example, be the wall of an adjacent container and the radar sensor may be configured to detect that this adjacent container is stacked on its own container. For this purpose, the control unit knows, for example, the expected distance to the underside of the other container.

According to a further embodiment, the second radar sensor arrangement is configured to detect a user approaching the radar sensor. Here, the radar sensor is configured to use the knowledge of the user's approach to control a display or backlight of the radar sensor.

For example, it may be provided that the backlight is switched on when a user is close to the radar sensor or the display is turned on.

According to another embodiment, the second radar sensor arrangement is configured to detect whether an opening of the container is open or not. If it is determined that the opening of the container is open, it may be provided that the radar sensor changes, e.g. increases (or decreases), the measurement rate of the first radar sensor arrangement. If, however, it is detected that the container opening is closed, a different measurement rate may be set accordingly.

It is possible that a flow of bulk material is introduced through an open container opening, which can falsify the measurement result if it crosses the measuring radar beam. Due to the detection that the container opening is open (or closed), the measurement rate may be throttled or the measurement can be completely suspended, as the measuring results are very likely to be wrong. In addition, this can be signaled to the user in the control centre.

It may be provided in accordance with a further embodiment to monitor a definable area with the second radar sensor arrangement, which is passed through by a liquid flow or a bulk material flow when filling a container and/or an open bulk material heap. The spatial area can be defined in particular by specifying an angle and/or by specifying a minimum and/or a maximum distance from the second radar sensor arrangement.

According to a further embodiment, it may be provided to detect the presence of a liquid or bulk material flow in the defined spatial area by means of a second evaluation device that is connected to the second radar sensor.

According to another embodiment, it may be provided to use the presence of a liquid or bulk material flow in the defined area when controlling the sequence of the first radar sensor arrangement. In particular, it can be provided to increase or decrease the measurement repetition rate of the first radar sensor in the presence of a liquid or bulk material flow in the defined area. It may also be provided to deactivate the first radar sensor arrangement in the presence of a liquid or bulk material flow in the defined area. This may prevent incorrect measurements and save energy.

According to another embodiment, it may be provided to use the presence of a liquid or bulk material flow in the defined area when evaluating the detected signals of the first radar sensor arrangement. In this way, faulty measurements can be prevented.

According to another embodiment, the second radar sensor arrangement is configured to be activated by touching or a tapping by a user, i.e. to wake up from a sleep mode.

A corresponding pressure sensor or capacitive sensor can be provided for this purpose. A switch can also be provided.

According to another embodiment, the first radar sensor arrangement is an FMCW radar sensor arrangement (FMCW: Frequency Modulated Continuous Wave) or a pulse radar sensor arrangement. The second radar sensor arrangement can be a chirp sequence arrangement, an FMCW arrangement or a pulse Doppler radar sensor arrangement.

According to another embodiment, the frequencies of the transmitted signals of the first radar sensor arrangement and the second radar sensor arrangement differ from each other. For example, the first radar sensor arrangement operates in a frequency range between 75 GHz and 85 GHz and the second radar sensor arrangement operates in a frequency range between 57 GHz and 64 GHz. This can simplify the approval of the device.

According to another embodiment, it is provided to make the second radar sensor arrangement interchangeable. In this case, the field device is configured to evaluate the information of the second radar sensor arrangement exactly when it is connected to the field device, e.g. by snapping or screwing it on.

A further aspect relates to a modular radar sensor arrangement, possibly interchangeable, configured to monitor environment of a field device and to be mounted to or in a measuring device housing. This radar sensor arrangement is, for example, an operating module and/or an indicating module of the field device which can also monitor the environment of the field device. The radar sensor arrangement may comprise an interface for transmitting data obtained by environmental monitoring to the field device, when the radar sensor arrangement is mounted to the field device.

A further aspect relates to a field device with a radar sensor arrangement described above and below, which may be interchangeable.

A further aspect relates to a container with a field device, as described above and below, attached to it. For example, the field device is screwed into a container opening. The first sensor arrangement of the field device, which may be a radar sensor arrangement, an ultrasonic sensor arrangement, a pressure sensor arrangement or a capacitive or vibratory sensor arrangement, is located, for example, on the side of the radar sensor facing the process and the second radar sensor arrangement is located on the opposite side facing away from the process, so that it may monitor the environment outside the container.

In the following, with reference to the figures, embodiments of the present disclosure are described. If the same reference signs are used in the figures, they denote identical or similar elements. The illustrations in the figures are schematic and not to scale.

BRIEF DESCRIPTION OF THE DRAWINGS

FIG. 2C shows the field device of FIG. 2A with a different beam direction of the second radar sensor arrangement.

FIG. 2D shows the angle of the beam directions according to FIG. 2C.

FIG. 3 shows a field device according to another embodiment.

DETAILED DESCRIPTION OF EMBODIMENTS

Figure 1:
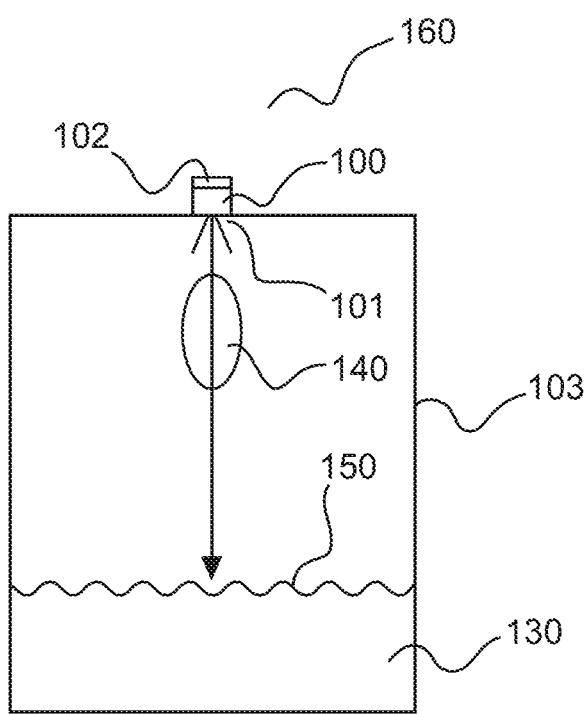
FIG. 1 shows a container with a field device mounted inside.

FIG. 1 shows a container 103 with a container opening in which a field device 100 is arranged. The field device 100 is, for example, a radar sensor which comprises a first radar sensor arrangement 101 and a second radar sensor arrangement 102.

The field device 100 can be configured for contactless fill level measurement. It can also be designed in the form of a TDR sensor or a vibration sensor. In the latter case, a limit level is detected.

In principle, the field device 100 can also be a pressure sensor or a flow sensor that comprises a "second" radar sensor arrangement 102 for environmental monitoring.

The first radar sensor arrangement is used to determine the fill level of the filling material or the medium 130 in container 103, for example, by transmitting a radar signal 140 in direction of the filling material surface 150, reflecting it there and receiving it again from the first radar sensor arrangement 101. The received, reflected measuring signal 140 is then analysed and the filling material echo is determined from whose position (which corresponds to the transmit time of the measuring signal) the level can be calculated.

The first radar sensor arrangement 101 can also be configured to scan the filling material surface, in order to determine the topology of the filling material surface. In this case, the first radar sensor arrangement can comprise a radar chip with an antenna array for beam control.

The second radar sensor arrangement 102 is designed for monitoring the environment 160 outside the container 103 and is arranged, for example, on or directly below the upper side of the field device, namely the side of the field device or radar sensor 100 facing away from the process side.

The radar sensor 100 is thus set up to monitor its environment and can in particular be used in fill level measurement technology, process measurement technology, production technology or automation industry.

For certain applications, it may be advantageous to monitor the environment of the field device. Since the second radar sensor arrangement 102 is used for this purpose, additional infrared sensors, ultrasonic sensors, capacitive sensors or cameras are not required for environmental monitoring.

In addition to the first sensor arrangement 101 of the field device 100, the radar sensor arrangement 102 is provided, which is mounted, for example, on the opposite side in the housing 105 and is used for environmental monitoring. This second sensor arrangement 102 may be equipped with other antenna devices as the first radar sensor arrangement 101, which may also be referred to as the process measurement radar module. For example, the process measurement radar module may be provided with a horn antenna, in order to measure the process variable, while the second radar sensor arrangement 102 may be equipped with patch antennas 202 (see FIG. 2A) for environment detection. The second radar sensor arrangement 102 can also be configured to measure through the housing wall of the radar sensor so that antennas are not necessarily visible from the outside.

Figures 2A, 2B:
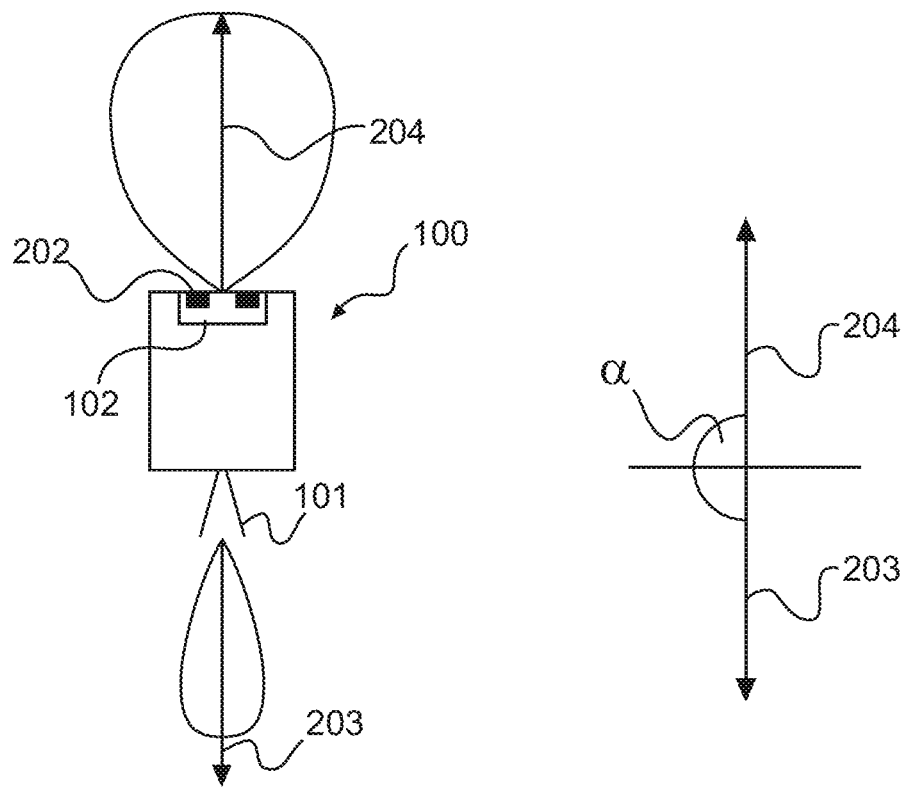
FIG. 2A shows a field device in the form of a radar sensor.
FIG. 2B shows the beam directions of a first radar sensor arrangement and a second radar sensor arrangement.

For environment detection, it may be provided that the main beam direction 204 of the second radar sensor arrangement 102 is oriented in a different direction than the main beam direction of the first radar sensor arrangement 101. In addition to an antiparallel alignment, as shown in FIG. 2B ($\alpha=180°$), an obtuse angle alignment, as shown in FIG. 2D ($\beta \geq 90°$), is useful.

It may also be provided that both the first radar sensor arrangement 101 and the second radar sensor arrangement 102 are designed as a so-called MIMO (Multiple Input Multiple Output) radar module or as a radar module with analog or digital beam shaping. This is shown, for example, in FIG. 3, which shows that the control unit 120 can control the circuit 121 of the first radar sensor arrangement 101 and a corresponding control circuit of the second radar sensor arrangement 102 in such a way that both measuring signals can be emitted in different directions, in order to scan the filling material surface or surroundings.

The radar sensor can be configured so that a backlight and/or the associated display located on the radar sensor 100 is only switched on when a person approaches or stands in front of the radar sensor or there is no object in front of the measuring device.

For this presence detection it may be provided to use the second radar sensor arrangement 102.

Figure 4:
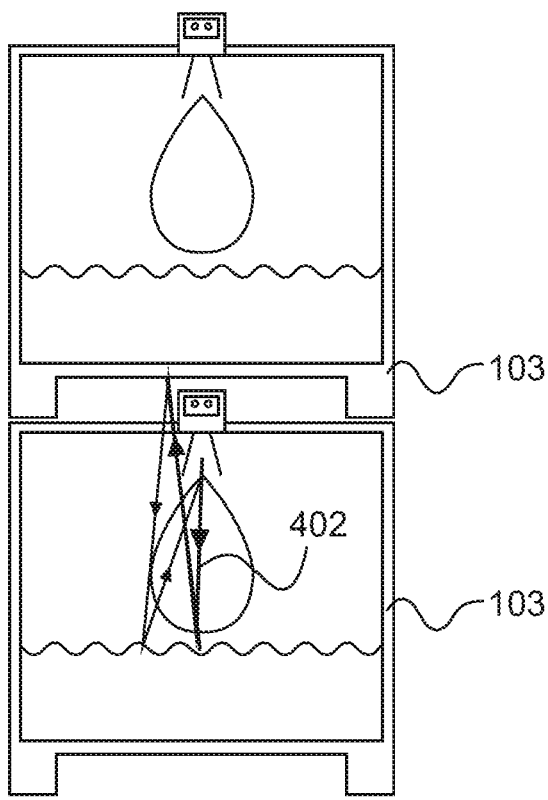
FIG. 4 shows two containers with field devices mounted inside.

The radar sensor can also be configured to be attached to stackable and mobile containers 103 as shown in FIG. 4. To detect whether there is another object (e.g. container) above the respective measuring instrument, the additional, second radar sensor arrangement 102 can be configured. This information can be used to calculate the measurement value. It is possible that due to stacked containers 103 "ghost targets" can be caused by multiple reflections 402 which do not exist in reality.

Figure 5:
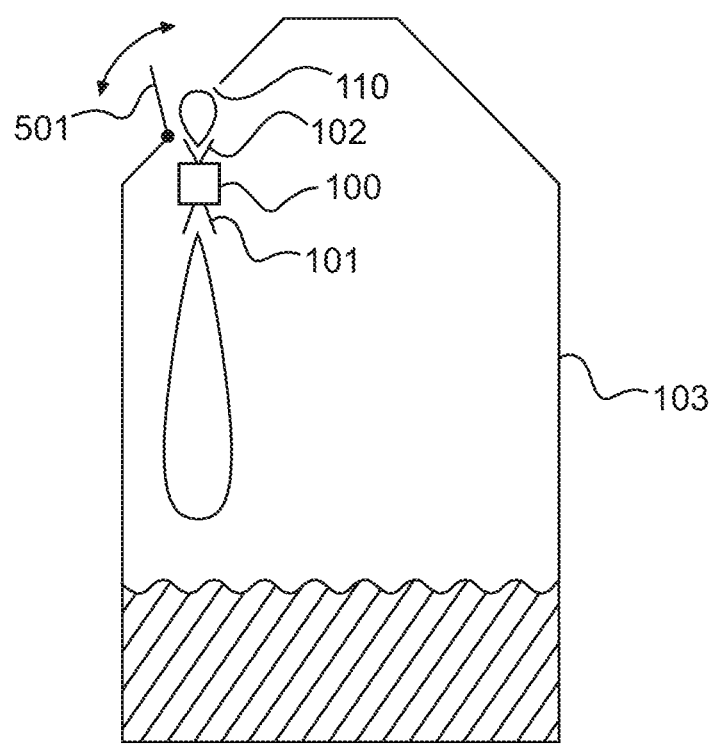
FIG. 5 shows a container with a field device mounted below a container opening.

It may also be provided that the measurement rates of the first and/or second radar sensor arrangement 101, 102 are adjusted depending on whether or not objects in the environment of the radar sensor are detected. For example, the radar sensors 100 can be mounted under a cover 501, i.e. below a container opening 110, and depending on whether the container is open or closed, the measurement rate can be increased or decreased (or vice versa). The measurement can also be adjusted completely. A corresponding measurement setup is shown in FIG. 5.

The present disclosure provides with a new operating concept in which the user interacts with the operating module of the radar sensor or field device via gestures. These gestures are detected by the second radar sensor arrangement 102, which is integrated in the operating module or in the housing of the radar sensor.

Figure 7A:
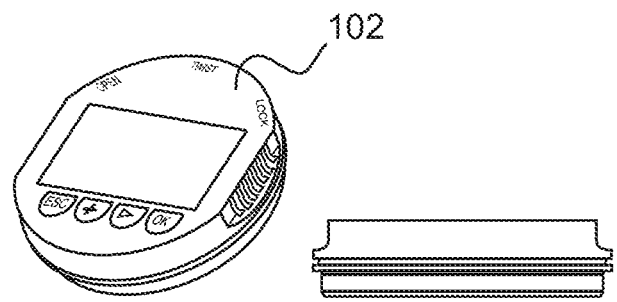
FIG. 7A shows an interchangeable radar sensor arrangement in the form of a control module in perspective view and side view.
Figure 7B:
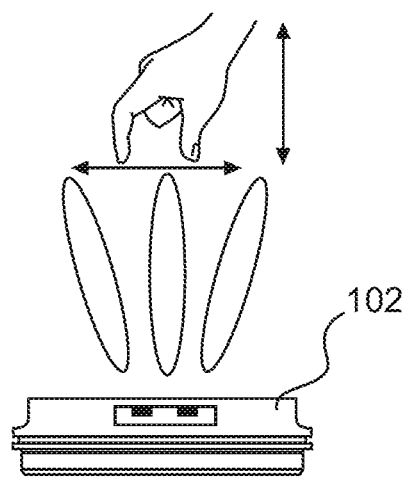
FIG. 7B shows an interchangeable radar sensor arrangement for gesture detection.

FIG. 7A shows an interchangeable radar sensor arrangement in the form of an operating module in perspective view and in side view. FIG. 7B shows the interchangeable radar sensor arrangement of FIG. 7A, which also shows the sensor device for gesture recognition.

Figure 6:
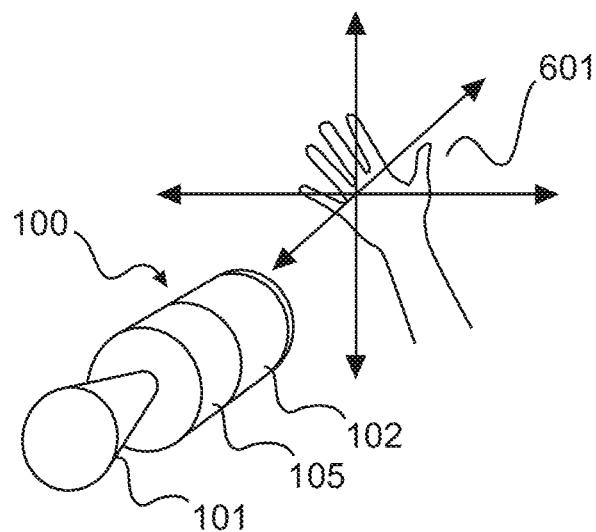
FIG. 6 shows an example of gesture recognition.

MIMO radar chips can be optimized to recognize hand gestures by using appropriate signal processing units. For this purpose, these radar chips are, for example, installed in the operating module in such a way that the main bean direction of the gesture-recognizing radar chip is essentially orthogonal to the display (see FIG. 7B). The operating module 102 is then installed in a field device (e.g. in a radar sensor 100) and is then located, for example, on the side of the field device housing opposite the process fitting as shown in FIG. 6.

An advantage of the radar method is that, in addition to distances, speeds can also be evaluated, which is not necessarily the case with other environmental monitoring sensors. Only by means of the speed component, it is possible to detect gestures with increased information density using radar.

The following modulation forms can be implemented: For example, the chirp sequence method, FMCW method or pulse Doppler method can be used for the environmental monitoring radar module (second radar sensor arrangement 102). For the measuring radar module (first radar sensor arrangement 101), for example, the FMCW method or the pulse Doppler radar method can be used. Alternatively, the radar methods mentioned above can be used.

Furthermore, the two radar sensor arrangements can be designed as MIMO systems. This means that a plurality of transmitting and/or receiving antennas can be present. In this way, the main radiation and main reception direction of the radar sensor arrangement can be controlled, which considerably contributes to the recognition of gestures (see FIG. 3).

To avoid the gesture-detecting radar sensor (more precisely: the second radar sensor arrangement 102) having to scan the environment all the time, it can be activated, for example, by the user knocking on the housing wall of the field device. After the knocking, the operating module or the field device can then be controlled and parameterized via gestures. This procedure has the advantage that the field device does not have to be unscrewed, which can be advantageous for field devices used in hazardous areas.

For this type of parameterization, the operating module requires signaling devices to provide the user with feedback on whether the commands entered via gesture control have been correctly understood. This feedback can be realized, for example, optically (display, LED), acoustically (signal emphasized) or vibronically (vibration of the housing).

Aspects of the present disclosure are listed below:

In addition to the usual process radar (first radar sensor arrangement) 101, the additional radar module (second radar sensor arrangement) 102 is arranged so that the main beam direction of the additional radar module is at an angle greater than 90° relative to the main beam direction of the process measurement module.

The two radar sensor arrangements 101, 102 can have different frequency ranges, radar modulation forms, signal processing algorithms, antenna constructions, antenna opening angle, number of transmitting and receiving antennas, measuring ranges, measuring time intervals, etc. . . . .

The measured variable can be determined using both radar sensor arrangements 101, 102.

The second radar sensor arrangement 102 can be used for environmental monitoring.

The second radar sensor arrangement 102 can be used for gesture control.

The radar sensor 100 can offer advantages with radar sensors for hazardous areas, as, for operating the sensor, the sensor does not have to be opened or the cover does not have to be screwed on.

The second radar sensor arrangement 102 for gesture control can comprise multiple transmit and/or receive antennas that allow analog or digital beamforming.

Both radar sensor arrangements 101, 102 can be configured to detect speeds as well as distances.

The energy of the radar sensor arrangements 101, 102 can be obtained from an IO-Link, 4 . . . 20 mA interface or a battery/accumulator.

In the case of gesture control, the user needs feedback on whether the information entered has been understood by the sensor. This can be in the form of a display, LEDs or a vibronic or acoustic signal.

To avoid having to permanently scan the environment, the gesture control can be activated by "knocking", for example.

It may be provided that the first radar sensor arrangement 101 and second radar sensor arrangement 102 are integrated in a semiconductor device. Waveguides, coaxial conductors or dielectric waveguides can be used to guide the signals to the respective antennas.

The radar chip in the operating module can be designed as a MIMO chip, a SIMO chip or a MOSI chip (one or a plurality of transmit or receive antennas) and can thus operate beam forming.

The radar chip in the control module can be configured according to the FMCW radar method, the chirp sequence method or the pulse Doppler method.

The main beam direction of the second radar sensor arrangement 102 is orthogonal on the display of the control module.

In addition, it should be noted that "comprising" and "having" do not exclude other elements or steps and the indefinite articles "a" or "an" do not exclude a plurality. It should also be noted that features or steps described with reference to one of the above embodiments may also be used in combination with other features or steps of other embodiments described above. Reference signs in the claims are not to be considered as restrictions.

The invention claimed is:

1. A radar sensor device, comprising:
   a process measurement radar module being a first radar sensor arrangement, which is located on a side of the radar sensor device facing a process, configured to radiate a first radar measuring signal and measure a fill level of a medium as a process parameter in a first direction for determining topology of a filling material surface; and
   a radar sensor arrangement, which is located on an opposite side of the radar sensor device facing away from the process, configured to radiate a second radar measuring signal and monitor an environment of the radar sensor device, in which the filling material surface to be measured is not located, in a second direction, the second direction being different from the first direction and having, with the first direction, an angle greater than 90°.

2. The radar sensor device according to claim 1, wherein the first direction and the second direction form an angle of 180 degrees.

3. The radar sensor device according to claim 1, further comprising
a measuring device housing,
wherein the process measurement radar module and the radar sensor arrangement are arranged in the measuring device housing.

4. The radar sensor device according to claim 1,
wherein the radar sensor arrangement is further configured to detect a gesture of a user, and
wherein the detected gesture is used to control the process measurement radar module.

5. The radar sensor device according to claim 1,
wherein the radar sensor arrangement is further configured to detect an interfering reflector outside a container, and
wherein knowledge of the interfering reflector is used to identify an interfering reflection detected by the process measurement radar module.

6. The radar sensor device according to claim 1,
wherein the radar sensor arrangement is further configured to detect a user approaching the radar sensor device, and
wherein knowledge of the user's approach is used to control a display or a backlight.

7. The radar sensor device according to claim 1,
wherein the radar sensor arrangement is configured to detect whether or not one or a plurality of objects are within a detection range of the radar sensor arrangement, and
wherein a measurement rate of the process measurement radar module is changed when one or the plurality of objects are detected as being within the detection range of the radar sensor arrangement.

8. The radar sensor device according to claim 1,
wherein the radar sensor arrangement is configured to detect whether or not an opening of a container is open, and
wherein a measurement rate of the process measurement radar module is changed when the opening is detected as being open.

9. The radar sensor device according to claim 1,
wherein the radar sensor arrangement is configured to be activated by touching, knocking or tapping by a user.

10. The radar sensor device according to claim 1,
wherein the process measurement radar module is an FMCW radar sensor arrangement or a pulse radar sensor arrangement, and
wherein the radar sensor arrangement is a chirp sequence radar sensor arrangement, an FMCW radar sensor arrangement, or a pulse Doppler radar sensor arrangement.

11. The radar sensor device according to claim 1,
wherein the process measurement radar module transmits radar signals in a first frequency range, and
wherein the radar sensor arrangement transmits radar signals in a second frequency range which is unequal to the first frequency range.

12. A device comprising:
a radar sensor arrangement, as a second radar sensor arrangement for the radar sensor device of claim 1, configured to monitor an environment of a field device and to be mounted to, or in, a measuring device housing of the field device, the radar sensor arrangement including an interface configured to transmit data obtained by the environment monitoring of the field device when the radar sensor arrangement is mounted on the field device.

13. The device according to claim 12, wherein the interface is further configured to supply power to the radar sensor arrangement from the field device.

14. The device according to claim 12, wherein the interface is a 4-20 mA two-wire interface.

15. The device according to claim 12, wherein the radar sensor arrangement is set up as an operating module of the field device.

16. The device according to claim 12, wherein the radar sensor arrangement is designed as an interchangeable radar sensor arrangement.

17. The device according to claim 12, wherein the device is a field device.

18. The device according to claim 12, wherein the device is a fill level measuring device, a pressure gauge, a flow meter or a limit level sensor.

19. The radar sensor device according to claim 12,
wherein the radar sensor device is configured to use measurement data of the environment of the second radar sensor arrangement to influence the measurement from the process measurement radar module.

20. The radar sensor device according to claim 12,
wherein the first radar sensor arrangement and the second radar sensor arrangement are integrated in a semiconductor device.

21. The radar sensor device according to claim 12, further comprising:
a measuring device housing,
wherein the process measurement radar module and the radar sensor arrangement are arranged in the measuring device housing.

22. The radar sensor device according to claim 21,
wherein the second radar sensor arrangement is configured to transmit the second radar measuring signal through a housing wall of the measuring device housing in the direction of the environment of the radar sensor device.

* * * * *